United States Patent
Kim et al.

(10) Patent No.: US 7,626,964 B2
(45) Date of Patent: Dec. 1, 2009

(54) METHOD AND APPARATUS FOR CONFIGURING TRANSPORT FORMAT COMBINATION SET IN A MOBILE COMMUNICATION SYSTEM

(75) Inventors: Soeng-Hun Kim, Suwon-si (KR);
Gert-Jan Van Lieshout, Staines (GB);
Kook-Heui Lee, Yongin-si (KR);
Youn-Hyoung Heo, Suwon-si (KR);
Himke Van Dervelde, Staines (GB);
No-Jun Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 11/387,057

(22) Filed: Mar. 23, 2006

(65) Prior Publication Data

US 2007/0008932 A1 Jan. 11, 2007

(30) Foreign Application Priority Data

Mar. 25, 2005 (KR) .................. 10-2005-0024962

(51) Int. Cl.
*H04W 4/00* (2009.01)
*H04B 7/00* (2006.01)
*H04B 7/216* (2006.01)

(52) U.S. Cl. .................. 370/335; 370/310.2; 370/328; 370/338; 370/342

(58) Field of Classification Search .............. 455/44, 455/59–62, 63.1, 67.11, 68–69, 70–71, 101–103, 455/418–420, 422.1, 450, 452.1–452.2, 455, 455/466, 509, 513–517, 522, 550.1, 556.2, 455/560–561; 370/310, 310.2, 328–329, 370/332–336, 338, 341–345, 349–350, 441–442, 370/479

See application file for complete search history.

(56) References Cited

U.S. PATENT DOCUMENTS

| | | | |
|---|---|---|---|
| 6,781,970 B1 * | 8/2004 | Ovesjo et al. | 370/328 |
| 7,386,011 B2 * | 6/2008 | Haim | 370/471 |
| 2002/0128035 A1 * | 9/2002 | Jokinen et al. | 455/552 |
| 2003/0069021 A1 * | 4/2003 | Speight | 455/450 |
| 2004/0233899 A1 * | 11/2004 | Vayanos et al. | 370/352 |
| 2005/0094656 A1 * | 5/2005 | Rao et al. | 370/431 |
| 2006/0039325 A1 * | 2/2006 | Sebire | 370/329 |

FOREIGN PATENT DOCUMENTS

| WO | WO 00/28760 | 5/2000 |
|---|---|---|
| WO | WO 2004/089013 A1 | 10/2004 |

* cited by examiner

*Primary Examiner*—Meless N Zewdu
(74) *Attorney, Agent, or Firm*—Roylance, Abrams, Berdo & Goodman, L.L.P.

(57) ABSTRACT

A method and apparatus for configuring a TFCS in a mobile communication system are provided. TrCH configuration information and TFCS configuration information are received in a TrCH establishment message from an RNC. A CTFC set including all possible combinations of TFs of different transport channels is calculated according to the TrCH configuration information. A determination is made as to whether the TFCS configuration information includes a TFC-CTFC auto mapping indicator. If the TFCS configuration information includes the TFC-CTFC auto mapping indicator, CTFCs included in the CTFC set are mapped to TFs in a one-to-one correspondence.

26 Claims, 17 Drawing Sheets

|       | DCH 1     | DCH 2     | DCH 3     |
|-------|-----------|-----------|-----------|
| TF 0  | 0 bit     | 0 bit     | 0 bit     |
| TF 1  | 1 x 100 bit | 1 x 150 bit | 1 x 200 bit |
| TF 2  | 2 x 100 bit | N/A     | N/A       |

FIG.5A
(CONVENTIONAL ART)

| CTFC 0  | DCH 1 = TF 0, DCH 2 = TF 0, DCH 3 = TF 0 |
|---------|------------------------------------------|
| CTFC 1  | DCH 1 = TF 1, DCH 2 = TF 0, DCH 3 = TF 0 |
| CTFC 2  | DCH 1 = TF 2, DCH 2 = TF 0, DCH 3 = TF 0 |
| CTFC 3  | DCH 1 = TF 0, DCH 2 = TF 1, DCH 3 = TF 0 |
| CTFC 4  | DCH 1 = TF 1, DCH 2 = TF 1, DCH 3 = TF 0 |
| CTFC 5  | DCH 1 = TF 2, DCH 2 = TF 1, DCH 3 = TF 0 |
| CTFC 6  | DCH 1 = TF 0, DCH 2 = TF 0, DCH 3 = TF 1 |
| CTFC 7  | DCH 1 = TF 1, DCH 2 = TF 0, DCH 3 = TF 1 |
| CTFC 8  | DCH 1 = TF 2, DCH 2 = TF 0, DCH 3 = TF 1 |
| CTFC 9  | DCH 1 = TF 0, DCH 2 = TF 1, DCH 3 = TF 1 |
| CTFC 10 | DCH 1 = TF 1, DCH 2 = TF 1, DCH 3 = TF 1 |
| CTFC 11 | DCH 1 = TF 2, DCH 2 = TF 1, DCH 3 = TF 1 |

FIG.5B
(CONVENTIONAL ART)

| TFC 0 | CTFC 0  |
|-------|---------|
| TFC 1 | CTFC 1  |
| TFC 2 | CTFC 2  |
| TFC 3 | CTFC 5  |
| TFC 4 | CTFC 6  |
| TFC 5 | CTFC 7  |
| TFC 6 | CTFC 8  |
| TFC 7 | CTFC 11 |

FIG.5C
(CONVENTIONAL ART)

|  | DCH 1 | DCH 2 | DCH 3 |
|---|---|---|---|
| TF 0 | 0 bit | 0 bit | 0 bit |
| TF 1 | 1 x 100 bit | 1 x 150 bit | 1 x 200 bit |
| TF 2 | 2 x 100 bit | N/A | N/A |

FIG.8A

| CTFC 0 | DCH 1 = TF 0, DCH 2 = TF 0, DCH 3 = TF 0 |
|---|---|
| CTFC 1 | DCH 1 = TF 1, DCH 2 = TF 0, DCH 3 = TF 0 |
| CTFC 2 | DCH 1 = TF 2, DCH 2 = TF 0, DCH 3 = TF 0 |
| CTFC 3 | DCH 1 = TF 0, DCH 2 = TF 1, DCH 3 = TF 0 |
| CTFC 4 | DCH 1 = TF 1, DCH 2 = TF 1, DCH 3 = TF 0 |
| CTFC 5 | DCH 1 = TF 2, DCH 2 = TF 1, DCH 3 = TF 0 |
| CTFC 6 | DCH 1 = TF 0, DCH 2 = TF 0, DCH 3 = TF 1 |
| CTFC 7 | DCH 1 = TF 1, DCH 2 = TF 0, DCH 3 = TF 1 |
| CTFC 8 | DCH 1 = TF 2, DCH 2 = TF 0, DCH 3 = TF 1 |
| CTFC 9 | DCH 1 = TF 0, DCH 2 = TF 1, DCH 3 = TF 1 |
| CTFC 10 | DCH 1 = TF 1, DCH 2 = TF 1, DCH 3 = TF 1 |
| CTFC 11 | DCH 1 = TF 2, DCH 2 = TF 1, DCH 3 = TF 1 |

FIG.8B

| TFC 0 | CTFC 0 |
| TFC 1 | CTFC 1 |
| TFC 2 | CTFC 2 |
| TFC 3 | CTFC 3 |
| TFC 4 | CTFC 4 |
| TFC 5 | CTFC 5 |
| TFC 6 | CTFC 6 |
| TFC 7 | CTFC 7 |
| TFC 8 | CTFC 8 |
| TFC 9 | CTFC 9 |
| TFC 10 | CTFC 10 |
| TFC 11 | CTFC 11 |

FIG.8C

|  | DCH 1 | DCH 2 | DCH 3 |
|---|---|---|---|
| TF 0 | 0 bit | 0 bit | 0 bit |
| TF 1 | 1 x 100 bit | 1 x 150 bit | 1 x 200 bit |
| TF 2 | 2 x 100 bit | N/A | N/A |

FIG.12A

| CTFC 0 | DCH 1 = TF 0, DCH 2 = TF 0, DCH 3 = TF 0 |
|---|---|
| CTFC 1 | DCH 1 = TF 1, DCH 2 = TF 0, DCH 3 = TF 0 |
| CTFC 2 | DCH 1 = TF 2, DCH 2 = TF 0, DCH 3 = TF 0 |
| CTFC 3 | DCH 1 = TF 0, DCH 2 = TF 1, DCH 3 = TF 0 |
| CTFC 4 | DCH 1 = TF 1, DCH 2 = TF 1, DCH 3 = TF 0 |
| CTFC 5 | DCH 1 = TF 2, DCH 2 = TF 1, DCH 3 = TF 0 |
| CTFC 6 | DCH 1 = TF 0, DCH 2 = TF 0, DCH 3 = TF 1 |
| CTFC 7 | DCH 1 = TF 1, DCH 2 = TF 0, DCH 3 = TF 1 |
| CTFC 8 | DCH 1 = TF 2, DCH 2 = TF 0, DCH 3 = TF 1 |
| CTFC 9 | DCH 1 = TF 0, DCH 2 = TF 1, DCH 3 = TF 1 |
| CTFC 10 | DCH 1 = TF 1, DCH 2 = TF 1, DCH 3 = TF 1 |
| CTFC 11 | DCH 1 = TF 2, DCH 2 = TF 1, DCH 3 = TF 1 |

FIG.12B

| CTFC 3 |
|--------|
| CTFC 4 |
| CTFC 8 |
| CTFC 9 |

FIG.12C

| TFC 0 | CTFC 0 |
|-------|--------|
| TFC 1 | CTFC 1 |
| TFC 2 | CTFC 2 |
| TFC 3 | CTFC 5 |
| TFC 4 | CTFC 6 |
| TFC 5 | CTFC 7 |
| TFC 6 | CTFC 10 |
| TFC 7 | CTFC 11 |

FIG.12D

|      | DCH 1      | DCH 2      | DCH 3      |
|------|------------|------------|------------|
| TF 0 | 0 bit      | 0 bit      | 0 bit      |
| TF 1 | 1 x 100 bit| 1 x 150 bit| 1 x 200 bit|
| TF 2 | 2 x 100 bit| N/A        | N/A        |
| RM   | 100        | 150        | 120        |

FIG.16A

| CTFC 0  | CONFIGURATION                              | REQUIRED Tx POWER COEFFICIENT |
|---------|--------------------------------------------|-------------------------------|
| CTFC 0  | DCH 1 = TF 0, DCH 2 = TF 0, DCH 3 = TF 0  | 0     |
| CTFC 1  | DCH 1 = TF 1, DCH 2 = TF 0, DCH 3 = TF 0  | 10000 |
| CTFC 2  | DCH 1 = TF 2, DCH 2 = TF 0, DCH 3 = TF 0  | 20000 |
| CTFC 3  | DCH 1 = TF 0, DCH 2 = TF 1, DCH 3 = TF 0  | 22500 |
| CTFC 4  | DCH 1 = TF 1, DCH 2 = TF 1, DCH 3 = TF 0  | 32500 |
| CTFC 5  | DCH 1 = TF 2, DCH 2 = TF 1, DCH 3 = TF 0  | 42500 |
| CTFC 6  | DCH 1 = TF 0, DCH 2 = TF 0, DCH 3 = TF 1  | 24000 |
| CTFC 7  | DCH 1 = TF 1, DCH 2 = TF 0, DCH 3 = TF 1  | 34000 |
| CTFC 8  | DCH 1 = TF 2, DCH 2 = TF 0, DCH 3 = TF 1  | 44000 |
| CTFC 9  | DCH 1 = TF 0, DCH 2 = TF 1, DCH 3 = TF 1  | 46500 |
| CTFC 10 | DCH 1 = TF 1, DCH 2 = TF 1, DCH 3 = TF 1  | 56500 |
| CTFC 11 | DCH 1 = TF 2, DCH 2 = TF 1, DCH 3 = TF 1  | 66500 |

FIG.16B

| CTFC | REQUIRED Tx POWER COEFFICIENT | r_CTFC | TFC I |
|---|---|---|---|
| CTFC 0 | 0 | r_CTFC 0 | TFC 0 |
| CTFC 1 | 10000 | r_CTFC 1 | TFC 1 |
| CTFC 2 | 20000 | r_CTFC 2 | TFC 2 |
| CTFC 3 | 22500 | r_CTFC 3 | TFC 3 |
| CTFC 4 | 32500 | r_CTFC 4 | TFC 4 |
| CTFC 5 | 42500 | r_CTFC 5 | TFC 5 |
| CTFC 6 | 24000 | r_CTFC 6 | TFC 6 |
| CTFC 7 | 34000 | r_CTFC 7 | TFC 7 |
| CTFC 8 | 44000 | r_CTFC 8 | TFC 8 |
| CTFC 9 | 46500 | r_CTFC 9 | TFC 9 |
| CTFC 10 | 56500 | r_CTFC 10 | TFC 10 |
| CTFC 11 | 66500 | r_CTFC 11 | TFC 11 |

FIG.16C

METHOD AND APPARATUS FOR CONFIGURING TRANSPORT FORMAT COMBINATION SET IN A MOBILE COMMUNICATION SYSTEM

PRIORITY

This application claims the benefit under 35 U.S.C. § 119(a) of a Korean Patent Application filed in the Korean Intellectual Property Office on Mar. 25, 2005 and assigned Serial No. 2005-24962, the entire disclosure of which is hereby incorporated by reference.

BACKGROUND OF THE INVENTION

1. Field of the Invention

The present invention relates generally to an operation for configuring a Transport Format Combination Set (TFCS) in a mobile communication system. More particularly, the present invention relates to a method and apparatus for efficiently transmitting and receiving control information required to configure a TFCS.

2. Description of the Related Art

Today's mobile communication systems are evolving toward high-speed, high-quality wireless data packet communication systems that provide data service and multimedia service beyond voice-oriented service provided at the early stage of system development.

In Universal Mobile Telecommunication Services (UMTS), a 3rd generation mobile communication system uses Wideband Code Division Multiple Access (WCDMA) based on the European mobile communication systems, Global System for Mobile communications (GSM) and General Packet Radio Services (GPRS). When a User Equipment (UE) or a Node B transmits data on a physical channel, the UE or Node B simultaneously transmits a Transport Format Combination Indicator (TFCI) indicating how the data was multiplexed. A TFCS is a set of Transport Format Combinations (TFCs) providing information regarding data multiplexing. The TFCs are identified by their TFCIs. The TFCS is configured at call setup and the configuration information of the TFCS is exchanged between a UE and a Radio Network Controller (RNC). If the TFCS configuration information is bulky, the time taken for the call setup is increased, leading to increased consumption of radio transmission resources.

FIG. 1 illustrates the configuration of a typical mobile communication system, UMTS herein.

Referring to FIG. 1, the mobile communication system includes a Core Network (CN) 100 and a plurality of Radio Network Subsystems (RNSs) 110 and 120. The RNSs 110 and 120 form a UMTS Terrestrial Radio Access Network (UTRAN). The CN 100 includes a Serving GPRS Support Node (SSGN) and a Gateway GPRS Support Node (GGSN) to connect the UTRAN to a packet data network such as the Internet.

The RNSs 110 and 120 have RNCs 111 and 112 and a plurality of Node Bs 113 to 116. For example, the RNC 110 includes the RNC 111 and the Node Bs 113 and 115, and the RNS 120 has the RNC 112 and the Node Bs 114 and 116. The RNCs 111 and 112 are classified into a serving RNC, drift RNC and controlling RNC according to their roles. The serving RNC manages information regarding UEs and is responsible for data transmission to and reception from the CN 100. The drift RNC is directly connected to a UE 130 wirelessly. The control RNC controls the radio resources of the Node Bs 113 to 116.

The RNCs 111 and 112 are connected to the Node Bs 113 to 116 via Iub interfaces. An Iur interface is defined between the RNCs 111 and 112. While not shown, the UE 130 is connected to the UTRAN via a Uu interface. The RNCs 111 and 112 allocate radio resources to the Node Bs 113 to 116 under their management, and the Node Bs 113 to 116 provide the allocated resources to the UE 130. The radio resources are configured on a cell basis and the radio resources of each Node B are resources of a particular cell managed by the Node B. The UE 130 establishes radio channels with the radio resources of cells managed by the Node Bs 113 to 116, and transmits and receives data to and from the cells on the radio channels. Since the UE 130 identifies only a physical channel configured on a cell basis, the distinction between Node B and cell is meaningless. Therefore, the terms "Node B" and "cell" are interchangeably used below.

FIG. 2 illustrates a hierarchical protocol architecture for the typical mobile communication system.

Referring to FIG. 2, the Uu interface is divided into a control plane (C-plane) 200 for exchanging control signals between the UE and the RNC and a user plane (U-plane) 202 for transmitting user data between the UE and RNC.

A Radio Resource Control (RRC) layer 204, Radio Link Control (RLC) layer 210, Medium Access Control (MAC) layer 214, and physical (PHY) layer 218 reside on the C-plane 200. On the U-plane 202, there are a Packet Data Convergence Protocol (PDCP) layer 206, Broadcast/Multicast Control (BMC) layer 208, RLC layer 210, MAC layer 214, and the PHY layer 218.

The PHY layer 218 provides an information delivery service by a radio transfer technology, corresponding to Layer 1 (L1) in the Open System Interconnection 7 (OSI 7) model. The PHY layer 218 is connected to the MAC layer 214 via transport channels (TrCHs) 216. Data is exchanged between the MAC layer 214 and the PHY layer 218 via the TrCHs 216. The Transport Formats (TFs) of the TrCHs 216 are determined according to how data is processed in the PHY layer 218. A set of TFs defined for one TrCH is called a Transport Format Set (TFS).

Table 1 below illustrates an exemplary TFS.

TABLE 1

| Semi-Static Part | Dynamic Part | |
| --- | --- | --- |
| TTI = 20 msec | TF 0 | 0x148 bit |
| Channel Coding = CC, ⅓ | TF 1 | 1x148 bit |
| RM = 155 | TF 2 | 2x148 bit |

As noted from the above Table 1, TF has two properties: semi-static part and dynamic part. The semi-static part is a property common to all TFs defined for a TrCH, inclusive of a Transmission Time Interval (TTI), channel coding and coding rate, and Rate Matching (RM) parameter.

The dynamic part is divided into a transport block size and a transport block set size. The dynamic part is different for each TF. The transport block is a data unit transmitted on a TrCH. In Table 1, one transport block has 148 bits.

The transport block set is the number of transport blocks transmitted for one TTI. In Table 1, the transport block set size is 1 for TF 1, which means that one block of 148 bits is transmitted for 20 msec.

A plurality of TrCHs can be multiplexed in one physical layer. Thus, data transmitted on the physical channel at a particular time instant can be expressed as a set of the TFs of the multiplexed TrCHs. If three TrCHs are multiplexed in the manner that Transport Channel 1=TF 0, Transport Channel 2=TF 2, Transport Channel 3=TF 1, the set of TFs is a TFC.

The UE and the RNC together preset available TFCs during call setup. The set of TFCs is a TFCS.

The MAC layer 214 delivers data received from the RLC layer 210 on logical channels 212 to the PHY layer 218 on appropriate TrCHs 216, and delivers data received from the PHY layer 218 to the RLC layer 210 on appropriate logical channels 212. The MAC layer 214 inserts additional information in data received on the logical channels 212, or interprets inserted data in data received on the TrCHs 216 and controls random access.

The MAC layer 214 is connected to the RLC layer 210 via the logical channels 212. The MAC layer 214 is divided into a plurality of sublayers. The RLC layer 210 is responsible for establishing and releasing the logical layers 212.

Typically for transmission, the RLC layer 210 segments, concatenates, or pads RLC Service Data Units (RLC SDUs) received from a higher layer to an appropriate size. The RLC layer 210 then constructs RLC SDUs by inserting information regarding the segmentation/concatenation/padding and sequence numbers into the RLC SDUs and transmits the RLC SDUs to a lower layer.

For reception, the RLC layer 210 Unacknowledged Mode (UM) re-constructs RLC SDUs by interpreting the sequence numbers and information regarding the segmentation/concatenation/padding of RLC SDUs received from the lower layer and transmits SDUs to the higher layer. The PDCP layer 206 resides above the RLC layer 210. The PDCP layer 206 is responsible for compression and decompression of a header of data carried in the form of an Internet Protocol (IP) packet and data delivery with integrity for where a serving RNC is changed due to the UE's mobility. The BMC layer 208 is also above the RLC layer 210. The BMC layer 208 supports the broadcast service of transmitting the same data to unspecified many UEs within a particular cell. The RRC layer 204 allocates or release radio resources between the UTRAN and the UE.

The UE and the RNC establish the TrCHs during call setup. This is the process of notifying the UE of the TFCs of the TrCHs and TFCS configuration information by the RNC, and establishing the TrCHs and configuring the TFCS correspondingly by the UE.

FIG. 3 is a diagram illustrating a signal flow for exchanging control messages for establishing TrCHs.

Referring to FIG. 3, an RNC 310 transmits a TrCH establishment message 315 to a UE 305. The TrCH establishment message 315 is a general message delivering TrCH-related control information, for example, Radio Bearer Setup or Transport Channel Reconfiguration.

The TrCH establishment message 315 includes TrCH configuration information 320 and TFCS configuration information 325. The TFCS configuration information 325 has TFC-Calculated Transport Format Combination (CTFC) mapping information 330.

The UE 305 configures TrCHs and a TFCS based on the received information 320 and 325, and transmits a Response message 340 to the RNC 310. Then the UE 305 and the RNC 310 transmit/receive data on the TrCHs.

FIG. 4 is a flowchart illustrating an operation for configuring a TFCS in the UE.

Referring to FIG. 4, the UE configures a TFCS based on TrCH configuration information and TFCS configuration information. Upon receipt of the TrCH configuration information in step 405, the UE calculates CTFCs based on the TrCH configuration information in step 410. The CTFCs are all available combinations of TFs for different TrCHs. In step 415, the CTFCs are mapped to TFCs based on TFC-CTFC mapping information set in the TFCS configuration information.

The TFCS configuration will be described in great detail with reference to FIGS. 5A, 5B and 5C. It is assumed that three TrCHs are configured for the UE. The semi-static part of each TrCH is not shown for clarity and conciseness.

The TFs of each TrCH are configured as illustrated in FIG. 5A. Three TFs are available for Dedicated CHannel 1 (DCH 1), two TFs for DCH 2, and two TFs for DCH 3. DCH x means a DCH with transport channel identifier x.

The UE calculates CTFCs using the TFs of the TrCHs. For example, the UE arranges the TrCHs in an identifier order and the TFs of a TrCH with a low identifier are arranged in an ascending order with respect to any of the TFs of a TrCH with a high identifier. The resulting combinations of the TFs of the TrCHs are CTFCs and the UE allocates identifiers to the CTFCs in order. Hence, CTFC n is a CTFC with identifier n. The CTFC calculation basically seeks to obtain all possible combinations of the TFs of the TrCHs.

The CTFC calculation is shown in FIG. 5B. The UE maps the TFs of DCH 1 in the order of the lowest TF to the highest TF, TF 0 to TF 2 to the lowest TF, TF 0 of DCH 2 and DCH 3. The resulting CTFCs are CTFC 0, CTFC 1 and CTFC 2.

The UE then maps the TFs of DCH 1 in the order of the lowest TF to the highest TF, TF 0 to TF2 to the second lowest TF, TF 1 of DCH 2 and the lowest TF, TF 0 of DCH 3. The resulting CTFCs are CTFC 3, CTFC 4 and CTFC 5.

The UE maps the TFs of DCH 1 in the order of the lowest TF to the highest TF, TF 0 to TF 2 to the lowest TF, TF 0 of DCH 2 and the second lowest TF, TF 1 of DCH 3. The resulting CTFCs are CTFC 6, CTFC 7 and CTFC 8.

The UE maps the TFs of DCH 1 in the order of the lowest TF to the highest TF, TF 0 to TF 2 to the second-lowest TF, TF 1 of DCH 2 and the second lowest TF, TF 1 of DCH 3. The resulting CTFCs are CTFC 9, CTFC 10 and CTFC 11.

After the CTFC calculation using the TFs of the TrCHs, the UE performs TFC-CTFC mapping which is the process of determining a combination of TFs for a particular TFC. Accordingly, signaled CTFCs are mapped sequentially to TFCs.

The TFC-CTFC mapping is carried out based on the TFC-CTFC mapping information set in the TFCS configuration information. The TFC-CTFC information indicates which TFCs are mapped to which CTFCs.

Referring to FIG. 5C, if TFC 0 is mapped to CTFC 0, TFC 0 is a combination of TF 0 for DCH 1, TF 0 for DCH 2, and TF 0 for DCH 3. If TFC 5 is mapped to CTFC 7, TFC 5 is a combination of TF 1 for DCH 1, TF 0 for DCH 2, and TF 1 for DCH3. The TFC-CTFC mapping information is signaled for each TFC. If 8 TFCs are used as illustrated in FIG. 5C, the individual CTFCs mapped to the TFCs are signaled.

The above TFC-CTFC mapping information signaling is effective for a small number of TFCs. However, as more TFCs are used, the amount of the TFC-CTFC mapping information is increased. As a result, signaling load increases.

Accordingly, there is a need for an improved method and apparatus for reducing signaling load when configuring TFCs.

SUMMARY OF THE INVENTION

An aspect of exemplary embodiments of the present invention is to address at least the above problems and/or disadvantages and to provide at least the advantages below. Accordingly, an aspect of exemplary embodiments of the present invention is to provide a method and apparatus for reducing time taken for call setup and efficiently using radio resources by reducing the amount of control information required for configuring a TFCS.

The present invention also provides a method and apparatus for configuring a TFCS in a rule set beforehand by a UE, instead of reducing the size of TFCS configuration information.

According to one aspect of exemplary embodiments the present invention, in a method of configuring a TFCS in a mobile communication system, transport channel configuration information and TFCS configuration information are received in a transport channel establishment message from an RNC. A CTFC set including all possible combinations of the TFs of different transport channels is calculated according to the Transport channel configuration information. A determination is made as to whether the TFCS configuration information includes a TFC-CTFC auto mapping indicator. If the TFCS configuration information includes the TFC-CTFC auto mapping indicator, CTFCs included in the CTFC set are mapped to TFCs in a one-to-one correspondence.

According to another aspect of exemplary embodiments the present invention, in a method of configuring a TFCS in a mobile communication system, transport channel configuration information related to establishment of transport channels is generated. TFCS configuration information including a TFC-CTFC auto mapping indicator indicating one-to-one mapping between CTFCs and TFCs is generated. The CTFCs are all possible combinations of the TFs of different transport channels. The transport channel configuration information and the TFCS configuration information are inserted into a transport channel establishment message. The transport channel establishment message is transmitted to a UE.

According to a further aspect of exemplary embodiments the present invention, in an apparatus for configuring a TFCS in a mobile communication system, a transmitter and receiver receives transport channel configuration information and TFCS configuration information in a transport channel establishment message from an RNC and transmits a response message to the RNC, when transport channels are completely configured according to the transport channel establishment message. A transport channel controller establishes the transport channels based on the transport channel configuration information. A CTFC calculator calculates a CTFC set including all possible combinations of the TFs of different transport channels according to the transport channel configuration information. A TFC-CTFC mapper determines whether the TFCS configuration information includes a TFC-CTFC auto mapping indicator, maps CTFCs included in the CTFC set to TFCs in a one-to-one correspondence, if the TFCS configuration information includes the TFC-CTFC auto mapping indicator, and provides information regarding the mapping to the transport channel controller.

According to still another aspect of exemplary embodiments the present invention, in an apparatus for configuring a TFCS in a mobile communication system, a transport channel configuration information generator generates transport channel configuration information related to establishment of transport channels. A TFCS configuration information generator generates TFCS configuration information including a TFC-CTFC auto mapping indicator indicating one-to-one mapping between CTFCs and TFCs. The CTFCs are all possible combinations of the TFs of different transport channels. A message combiner inserts the transport channel configuration information and the TFCS configuration information into a transport channel establishment message. A transmitter and receiver transmit the transport channel establishment message to a UE.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 5A illustrates an example of TrCH configuration information;

FIG. 5B illustrates an exemplary CTFC calculation;

FIG. 5C illustrates an example of TFC-CTFC mapping information;

FIG. 8A illustrates an example of TrCH configuration information according to an exemplary embodiment of the present invention;

FIG. 8B illustrates an example of CTFC calculation according to an exemplary embodiment of the present invention;

FIG. 8C illustrates an example of TFC-CTFC mapping information according to an exemplary embodiment of the present invention;

FIG. 12A illustrates an example of TrCH configuration information according to an exemplary embodiment of the present invention;

FIG. 12B illustrates an example of CTFC calculation according to an exemplary embodiment of the present invention;

FIG. 12C illustrates an example of unused CTFC set information according to an exemplary embodiment of the present invention;

FIG. 12D illustrates an example of TFC-CTFC mapping information according to an exemplary embodiment of the present invention;

FIG. 16A illustrates an example of TrCH configuration information according to an exemplary embodiment of the present invention;

FIG. 16B illustrates an example of CTFC calculation and transmission output coefficient calculation according to an exemplary embodiment of the present invention;

FIG. 16C illustrates an example of automatic TFC-CTFC mapping according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known function and constructions are omitted for clarity and conciseness.

The present invention is intended to provide a method of mapping TFCs to CTFCs according to a predetermined rule without the need for signaling TFC-CTFC mapping information.

CTFCs are mapped in an ascending order of identifier to TFCs in a one-to-one correspondence. The TFC-CTFC mapping is valid under the premise that all CTFCs are mapped to TFCs. For example, unused CTFCs exist in voice communications in view of the nature of a CODEC, whereas, typically every CTFC is used in data communications. Therefore, mapping CTFCs to TFCs may be possible in a one-to-one correspondence in data communications according to an exemplary embodiment of the present invention.

The one-to-one mapping between TFCs and CTFCs obviates the need for transmitting TFC-CTFC mapping information, thereby saving radio resources from signaling.

Figure 1:
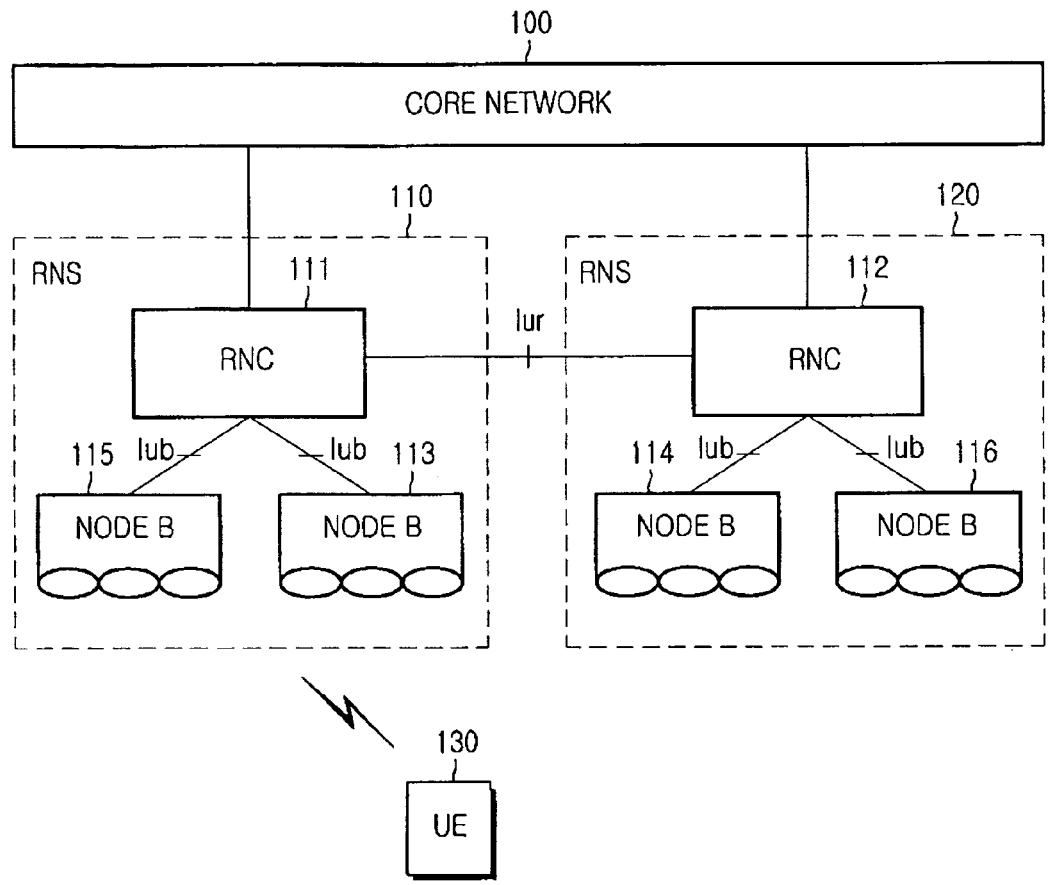
FIG. 1 illustrates the configuration of a UTRAN in a UMTS system applied to the present invention.
Figure 2:
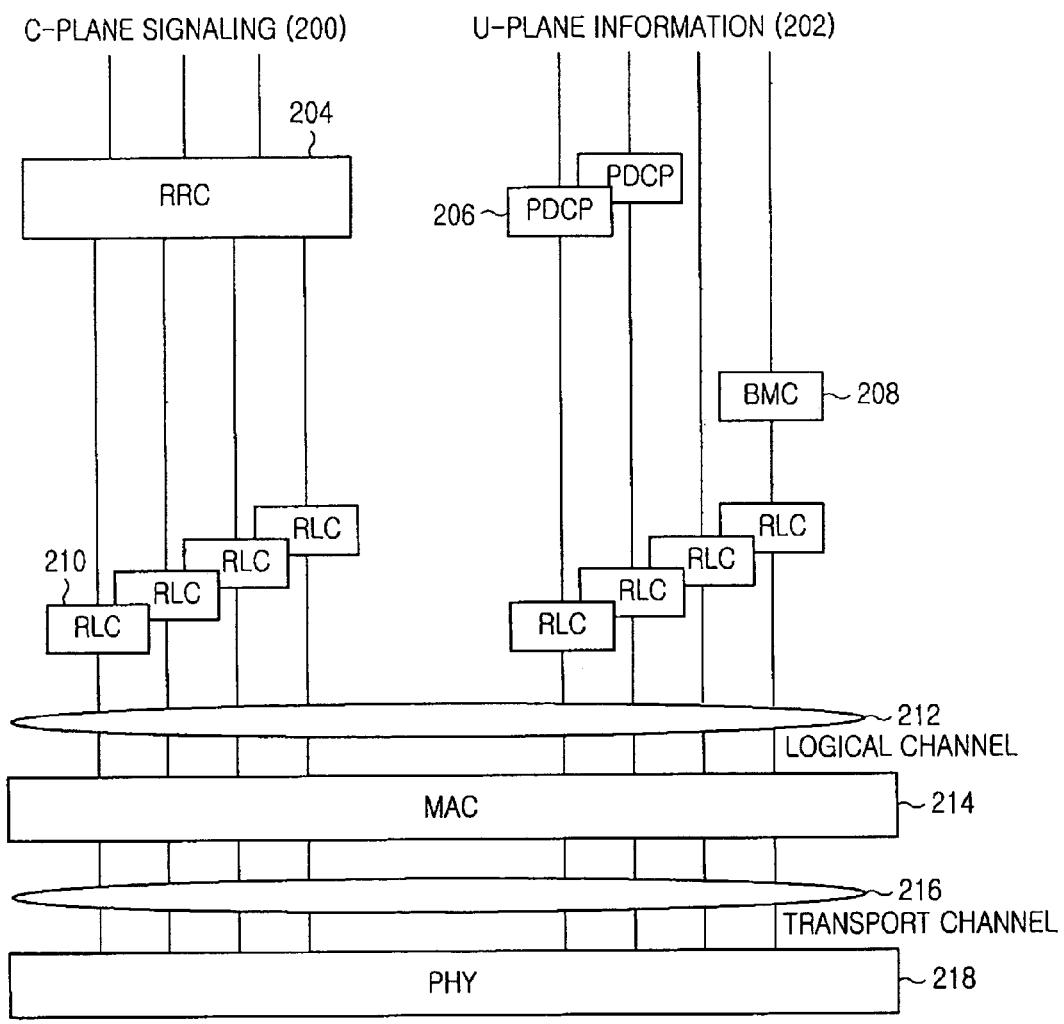
FIG. 2 illustrates a hierarchical radio protocol architecture for the mobile communication system applied to the present invention.
Figure 3:
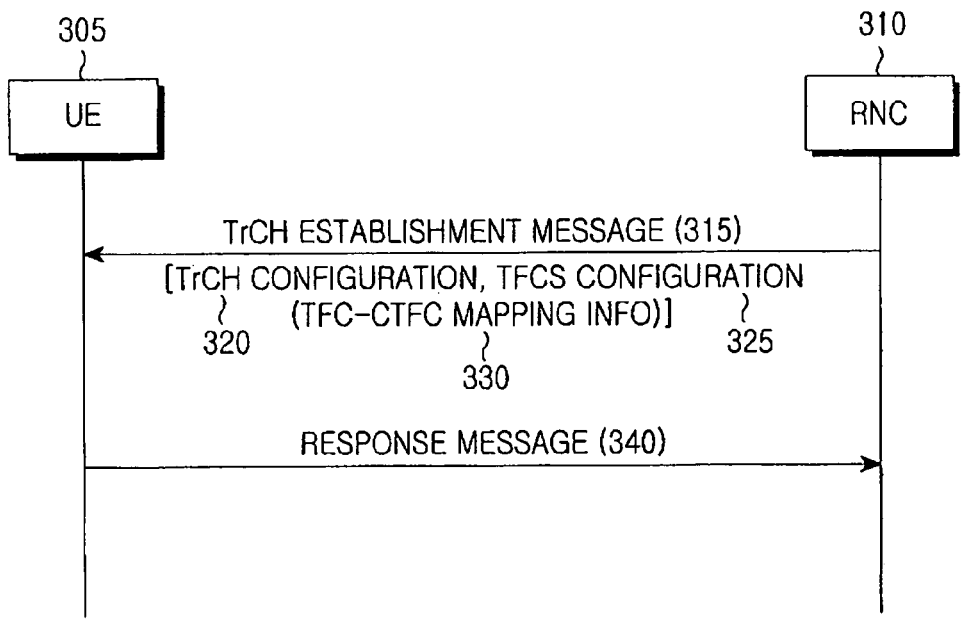
FIG. 3 is a diagram illustrating a signal flow for exchanging control messages in establishing TrCHs.
Figure 4:
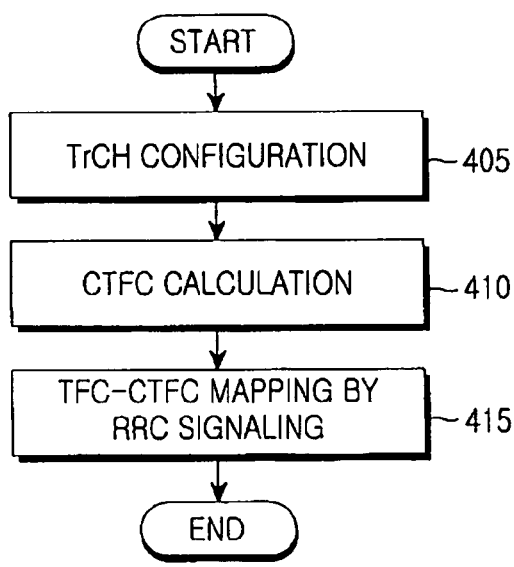
FIG. 4 is a flowchart illustrating a TFCS configuration operation in a UE.
Figure 6:
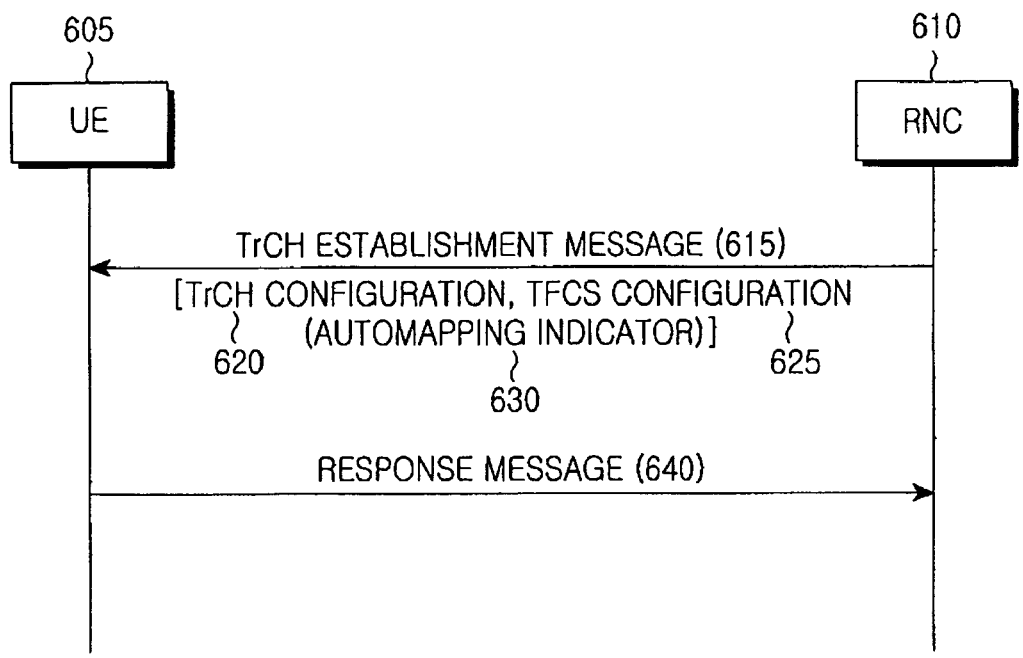
FIG. 6 is a diagram illustrating a signal flow for exchanging control messages to configure a TFCS in the UE according to an exemplary embodiment of the present invention.

FIG. 6 is a diagram illustrating a signal flow for exchanging control messages to configure a TFCS in a UE according to an exemplary embodiment of the present invention.

Referring to FIG. 6, an RNC 610 transmits a TrCH establishment message 615 to a UE 605. The TrCH establishment message 615 is a general message delivering TrCH-related control information, for example, Radio Bearer Setup or Transport Channel Reconfiguration.

The TrCH establishment message 615 includes TrCH configuration information 620 and TFCS configuration information 625. The TFCS configuration information 625 has information commanding automatic TFC-CTFC mapping 630 called an auto mapping indicator, instead of TFC-CTFC mapping information.

The UE 605 configures TrCHs and a TFCS based on the received information 620 and 625. The UE 605 calculates a CTFC set, maps the CTFCs to TFCs according to a predetermined rule, and transmits a Response message 640 to the RNC 610. The UE 605 and the RNC 610 then transmit/receive data on the TrCHs.

Figure 7:
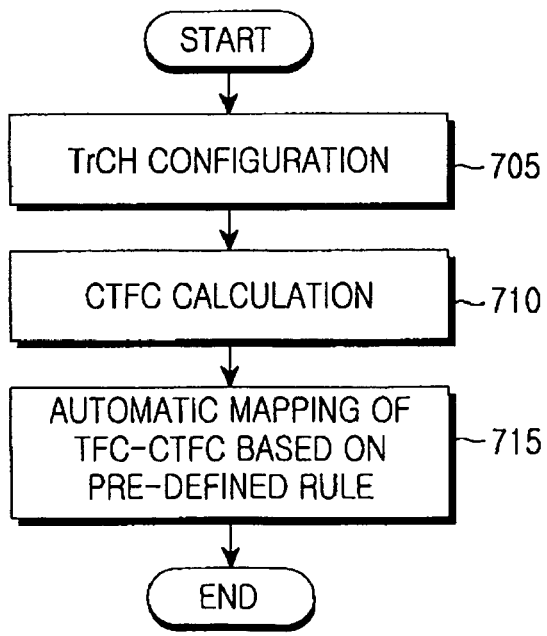
FIG. 7 is a flowchart illustrating a TFCS configuration operation in the UE according to an exemplary embodiment of the present invention.

FIG. 7 is a flowchart illustrating a TFCS configuration operation using the TrCH configuration information and the TFCS configuration information in the UE according to an exemplary embodiment of the present invention.

Referring to FIG. 7, upon receipt of TrCH configuration information and TFCS configuration information in step 705, the UE calculates CTFCs based on the TrCH configuration information in step 710. In step 715, if the TFCS configuration information includes an auto mapping indicator, the UE maps the CTFCs to TFCs in a one-to-one correspondence.

The TFCS configuration will be described in great detail with reference to FIGS. 8A, 8B and 8C.

As illustrated in FIG. 5A, three TrCHs are configured for the UE, and the TFs of each TrCH are given as illustrated in FIG. 8A. Three TFs are available for DCH 1, two TFs for DCH 2, and two TFs for DCH 3. The UE calculates CTFCs using the TFs of the TrCHs.

The CTFC calculation results are shown in FIG. 8B. The CTFC calculation is performed in a similar manner as conventionally done as illustrated in FIG. 5B. That is, the UE calculates CTFCs using the TFs of the given TrCHs.

If the auto mapping indicator is set in the TFCS configuration information, the UE maps the CTFCs to TFCs in a one-to-one correspondence in an ascending order of the identifier.

Figure 9:
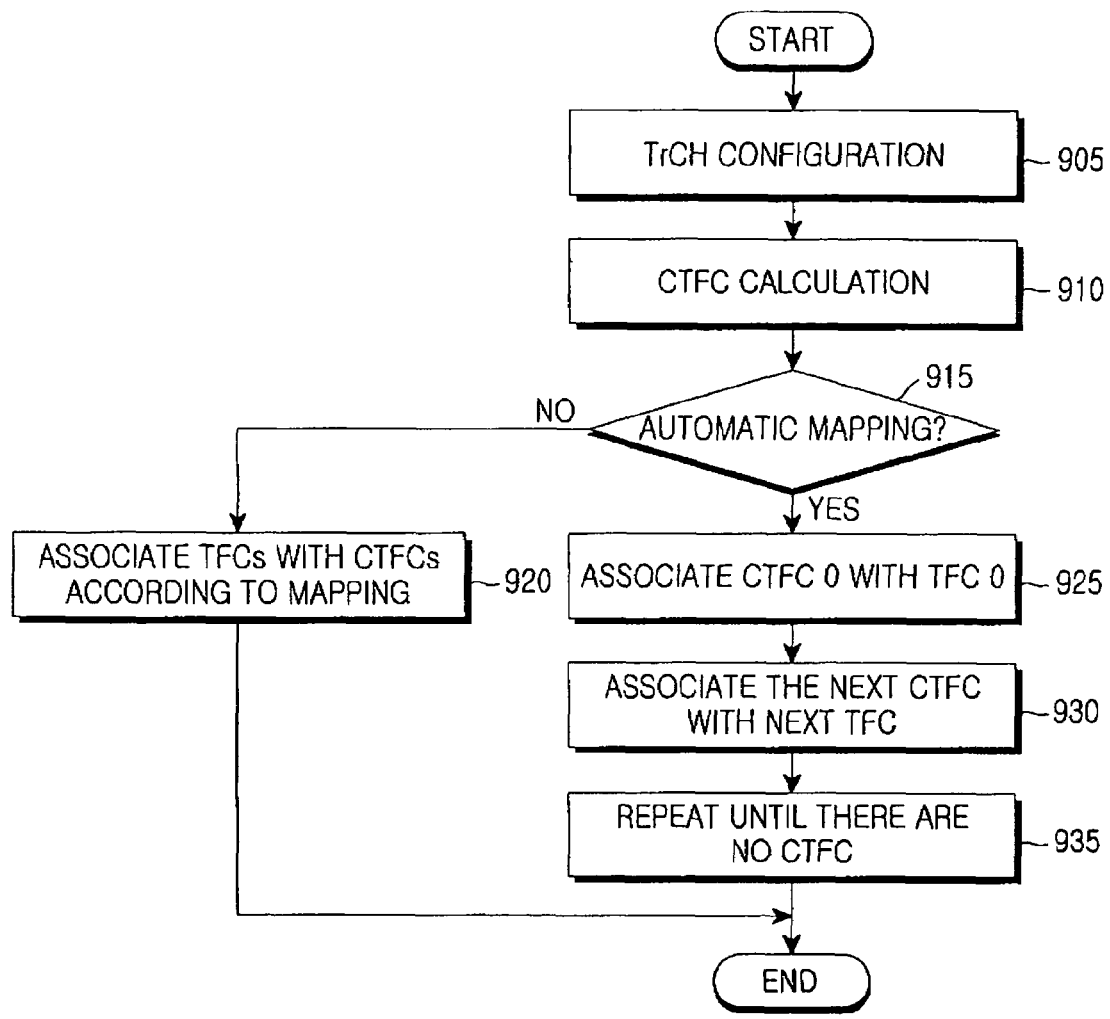
FIG. 9 is a flowchart illustrating an operation of the UE according to an exemplary embodiment of the present invention.

FIG. 9 is a flowchart illustrating an operation of the UE according to an exemplary embodiment of the present invention.

Referring to FIG. 9, upon receipt of TrCH configuration information by a TrCH establishment message in step 905, the UE calculates a set of CTFCs based on the received information in step 910.

In step 915, the UE determines whether the TrCH establishment message includes an auto mapping indicator. In the absence of the auto mapping indicator, the UE maps the CTFCs to TFCs according to TFC-CTFC mapping information set in TFCS configuration information received by the TrCH establishment message as in step 920.

In the presence of the auto mapping indicator, the UE maps CTFC 0 to TFC 0 in step 925 and maps the next CTFC to the next TFC in step 930. In step 935, the UE repeats the automatic mapping until every CTFC is mapped to a TFC.

In an exemplary implementation, every CTFC may be used as a TFC. However, some CTFCs may not be used. For example, more than 1024 CTFCs exist. Since the maximum size of TFCS is 1024, every CTFC is not viable.

On the other hand, the RNC may limit the use of certain CTFCs. For instance, if a packet size corresponding to a particular CTFC is too large, the CTFC may not be used.

In this context, predetermined CTFCs are excluded from TFC-CTFC mapping in order to efficiently cope with the above situation in an exemplary embodiment of the present invention.

Figure 10:
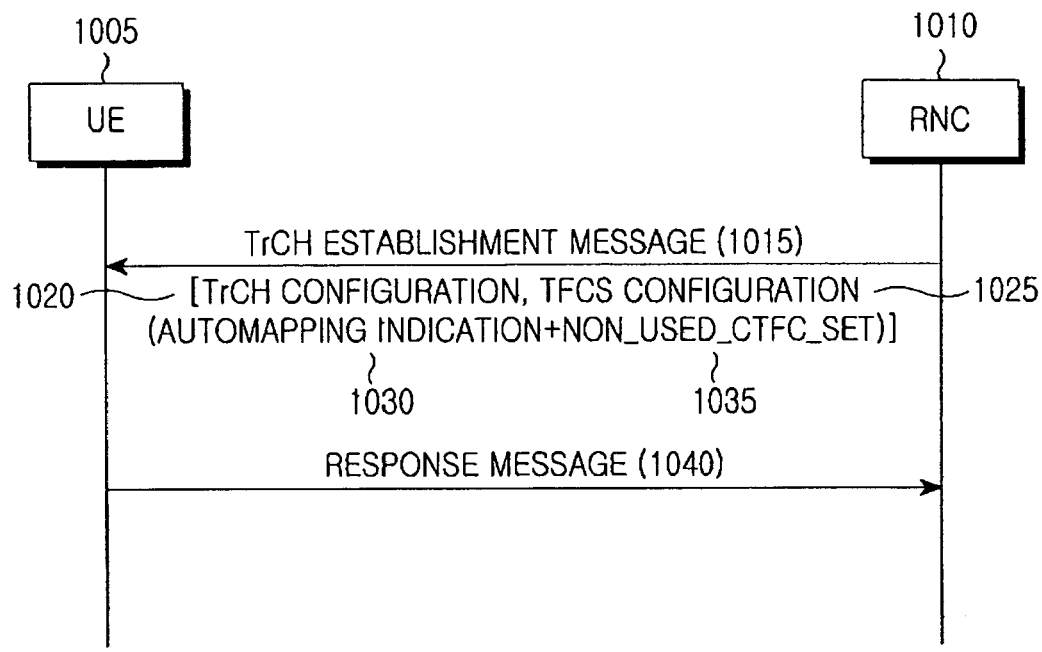
FIG. 10 is a diagram illustrating a signal flow for exchanging control messages for configuring a TFCS in the UE according to an exemplary embodiment of the present invention.

FIG. 10 is a diagram illustrating a signal flow for exchanging control messages for configuring a TFCS in a UE according to an exemplary embodiment of the present invention.

Referring to FIG. 10, an RNC 1010 transmits a TrCH establishment message 1015 to a UE 1005. The TrCH establishment message 1015 is a general message delivering TrCH-related control information, for example, Radio Bearer Setup or Transport Channel Reconfiguration.

Like the conventional TrCH establishment message, the TrCH establishment message 1015 includes TrCH configuration information 1020 and TFCS configuration information 1025. Yet, the TFCS configuration information 1025 has an auto mapping indicator 1030 and information regarding CTFCs to be excluded from TFC-CTFC mapping 1035, instead of TFC-CTFC mapping information. The set of CTFCs to be excluded from TFC-CTFC mapping is called non_used_CTFC_set.

The UE 1005 configures TrCHs and a TFCS based on the received information 1020 and 1025. The UE 1005 calculates a CTFC set, eliminates the CTFCs of non_used_CTFC_set from the CTFC set, maps the remaining CTFCs to TFCs, and transmits a Response message 1040 to the RNC 1010. The UE 1005 and the RNC 1010 then transmit/receive data on the TrCHs.

Figure 11:
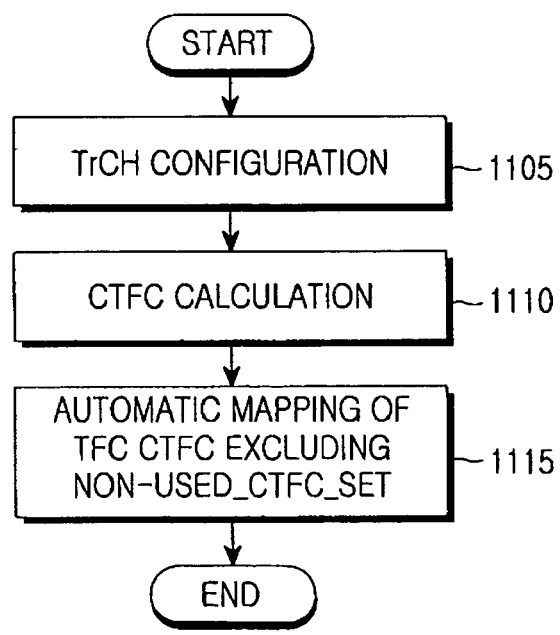
FIG. 11 is a flowchart illustrating a TFCS configuration operation in the UE according to an exemplary embodiment of the present invention.

FIG. 11 is a flowchart illustrating a TFCS configuration operation using TrCH configuration information and TFCS configuration information in the UE according to an exemplary embodiment of the present invention.

Referring to FIG. 11, upon receipt of TrCH configuration information and TFCS configuration information in step 1105, the UE calculates CTFCs based on the TrCH configuration information in step 1110. In step 1115, if the TFCS configuration information includes an auto mapping indicator and non_used_CTFC_set, the UE eliminates the CTFCs of non_used_CTFC_set from the calculated CTFCs and maps the remaining CTFCs to TFCs in a one-to-one correspondence.

The TFCS configuration will be described in great detail with reference to FIGS. 12A to 12D.

As illustrated in FIG. 5A, three TrCHs are configured for the UE. The TFs of each TrCH are given as illustrated in FIG. 12A. Three TFs are available for DCH 1, two TFs for DCH 2, and two TFs for DCH 3. The UE calculates CTFCs using the TFs of the TrCHs.

The CTFC calculation results are shown in FIG. 12B. The CTFC calculation is performed in a similar manner as illustrated in FIG. 5B. That is, the UE calculates CTFCs using the TFs of the given TrCHs.

If the auto mapping indicator and non_used_CTFC_set are included in the TFCS configuration information, the UE eliminates the CTFCs of non_used_CTFC_set from the CTFC set and maps the remaining CTFCs to TFCs. The CTFC set is the set of CTFCs calculated in the conventional method, as illustrated in FIG. 12B, and non-used CTFCs are the CTFCs included in non_used_CTFC_set.

For example, if non_used_CTFC_set is given as illustrated in FIG. 12C, then CTFC3, CTFC4, CTFC8 and CTFC 9 are excluded from TFC-CTFC mapping. The UE then automatically maps the remaining CTFCs, CTFC0, CTFC1, CTFC2, CTFC5, CTFC6, CTFC7, CTFC10 and CTFC11 to TFC0, TFC1, TFC2, TFC3, TFC4, TFC5, TFC6 and TFC7, respectively.

Figure 13:
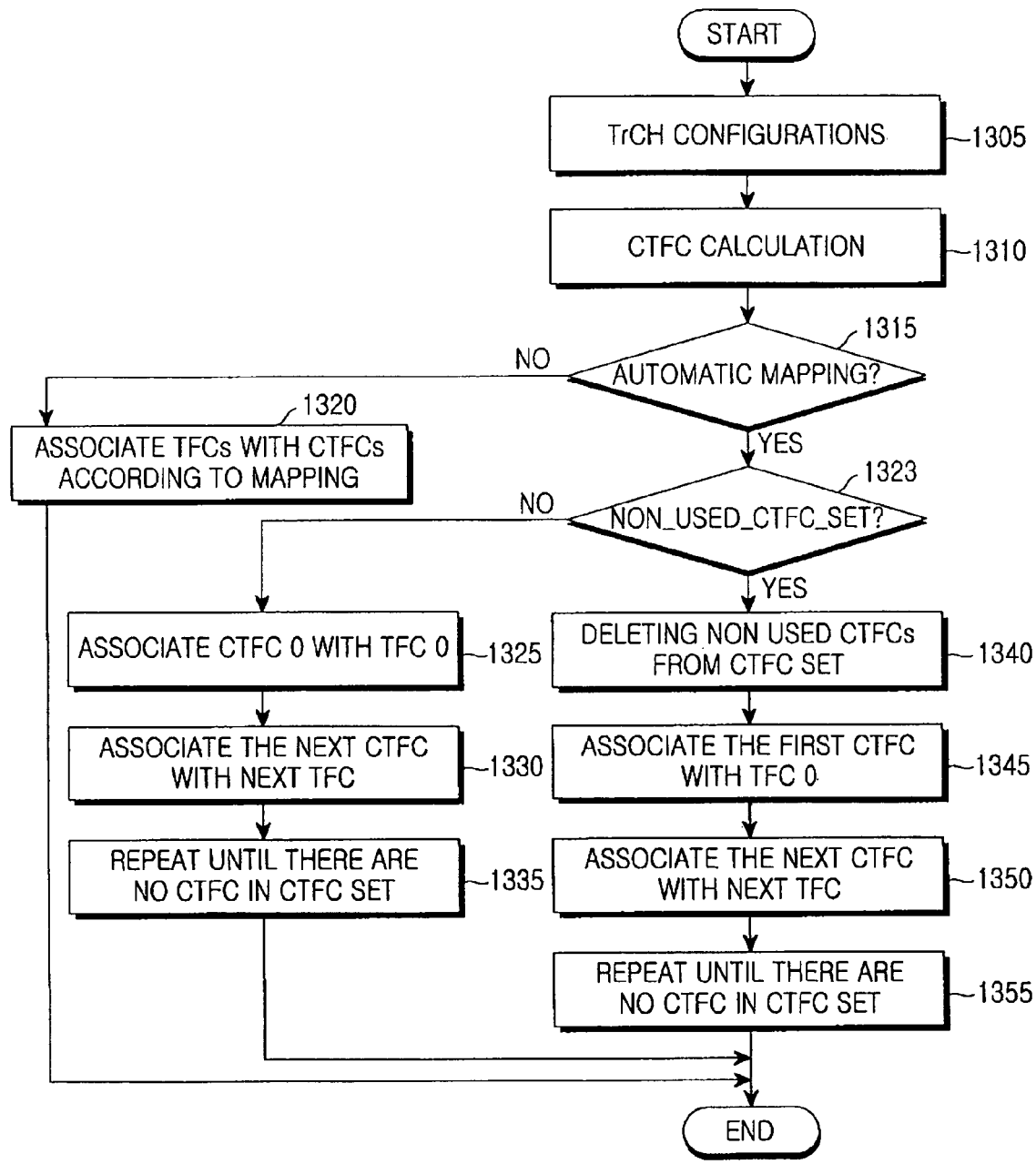
FIG. 13 is a flowchart illustrating an operation of the UE according to an exemplary embodiment of the present invention.

FIG. 13 is a flowchart illustrating an operation of the UE according to an exemplary embodiment of the present invention.

Referring to FIG. 13, upon receipt of TrCH configuration information by a TrCH establishment message in step 1305, the UE calculates a set of CTFCs based on the received information in step 1310.

In step 1315, the UE determines whether the TrCH establishment message includes an auto mapping indicator. In the absence of the auto mapping indicator, the UE maps the CTFCs to TFCs according to TFC-CTFC mapping information set in TFCS configuration information received by the TrCH establishment message as in step 1320.

In the presence of the auto mapping indicator, the UE determines whether the TFCS configuration information includes non_used_CTFC_set in step 1323.

In the absence of non_used_CTFC_set, the UE proceeds to step 1325.

Specifically, the UE maps CTFC 0 to TFC 0 in step 1325 and maps the next CTFC to the next TFC in step 1330. In step 1335, the UE repeats the automatic mapping until every CTFC is mapped to a TFC.

In the presence of non_used_CTFC_set, the UE eliminates the CTFCs of non_used_CTFC_set from the CTFC set and maps a CTFC with the lowest identifier in the new set of the remaining CTFCs to TFC0 in step 1345. The UE then maps the next CTFC to the next TFC in step 1350. In step 1355, the UE repeats the automatic mapping until every CTFC in the new CTFC set is mapped to a TFC.

Since reference is not given to transmit power in TFC-CTFC mapping in the exemplary embodiments of the present invention above, TFC ordering is performed irrespective of transmit power. Thus, it may occur that the transmit power of TFC n is higher than TFC (n+1).

Due to the TFC ordering irrespective of transmit power, TFC control may not work well in the RNC.

The TFC control aims to control the maximum transmit power of a particular UE in the TNC. The RNC notifies the UE of a minimum allowed TFC index.

The minimum allowed TFC index indicates the lowest TFC identifier among the identifiers of available TFCs for the UE. For example, if the minimum allowed TFC index is x, only TFCs ranging form TFC 0 to TFC x are available to the UE.

The use of the minimum allowed TFC index requires ordering of TFCs in an ascending order of transmit power. Thus, the transmit power of TFC x must be lower than that of TFC (x+1).

An exemplary embodiment of the present invention is intended to provide a method of ordering TFCs in the order of transmit power along with automatic TFC-CTFC mapping.

When user data is transmitted on a physical channel, higher transmit power is required for a larger size of user data. If the amount of data corresponding to TFC x is greater than that of data corresponding to TFC y, transmit power is usually higher in the former data than in the latter data However, if a plurality of TrCHs is multiplexed on one physical channel, a Quality of Service (QoS) of the TrCHs affects transmit power. For example, the following TFCs are given in Table 2.

TABLE 2

| TFC x | DCH 1 = 100 bit | DCH 2 = 100 bit |
| TFC y | DCH 1 = 50 bits | DCH 2 = 150 bit |

Although TFC x and TFC y are identical in terms of data amount, that is 200 bits, if DCH 1 requires a higher QoS level than DCH 2, higher transmit power is applied to TFC x, which transmits more data on DCH 1 than TFC y.

As described above, since QoS requirement as well as data size affects transmit power, a transmit power requirement must be calculated for each CTFC, while taking into account these two factors.

A transport power coefficient for CTFC x is computed by $$\text{required\_Tx\_Power\_Coefficient\_CTFC\_x} = \sum_{i=1}^{n} RM(i) \cdot \text{TrCH}(i)\_x \quad (1)$$

where required_Tx_Power_Coefficient is a relative transmit power value required to transmit data according to a CTFC, TrCH(i)_x is the amount of data transmitted on a TrCH with identifier i, and RM(i) is a RM parameter for the TrCH with identifier i. RM(i) is an integer between 1 and 256. The RM parameter is referred to when determining the number of punctured or repeated bits for rate matching. The RM is proportional to the QoS of the TrCH. In other words, a higher RM parameter is allocated to a TrCH with a higher QoS requirement.

As stated before, the QoS of data as well as the amount of the data affects transmit power. Therefore, a relative transmit power required for a CTFC can be computed by multiplying the amount of data transmitted on each TrCH by the RM parameter.

Figure 14:
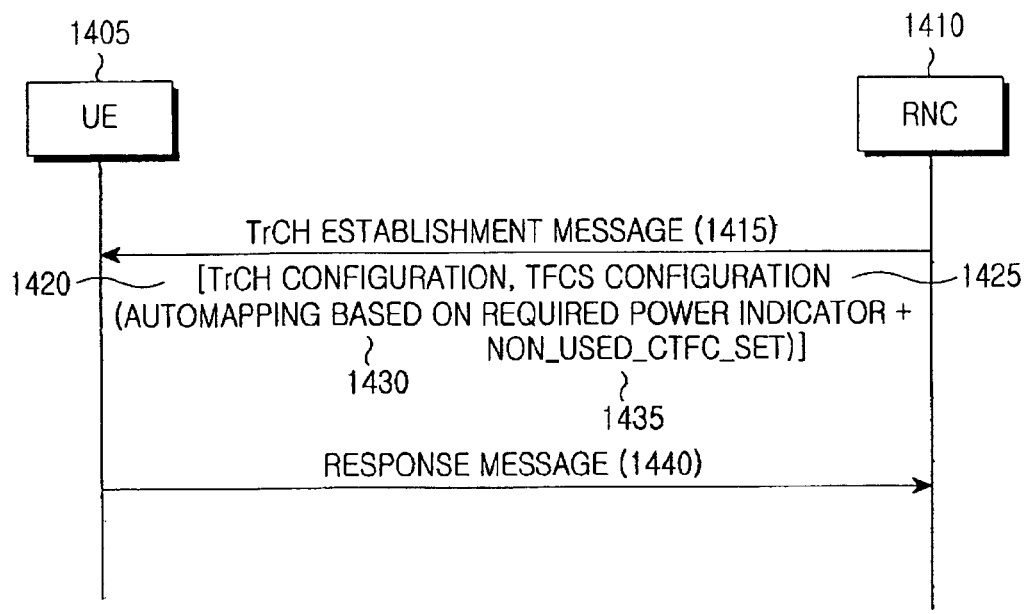
FIG. 14 is a diagram illustrating a signal flow for exchanging control messages for configuring a TFCS in the UE according to an exemplary embodiment of the present invention.

FIG. 14 is a diagram illustrating a signal flow for exchanging control messages for configuring a TFCS in the UE according to an exemplary embodiment of the present invention.

Referring to FIG. 14, an RNC 1410 transmits a TrCH establishment message 1415 to a UE 1405. The TrCH establishment message 1415 is a general message delivering TrCH-related control information, for example, Radio Bearer Setup or Transport Channel Reconfiguration.

The TrCH establishment message 1415 includes TrCH configuration information 1420 and TFCS configuration information 1425. The TFCS configuration information 1425 includes information 1430 commanding automatic TFC-CTFC mapping according to transmit power and information 1435 regarding CTFCs to be excluded from TFC-CTFC mapping (i.e. non_used_CTFC_set), instead of TFC-CTFC mapping information.

The information 1430 commanding automatic TFC-CTFC mapping according to transmit power is called "an auto mapping based on required power indicator".

The UE 1405 configures TrCHs and a TFCS based on the received information 1420 and 1425, calculates a CTFC set, eliminates the CTFCs of non_used_CTFC_set 1435 from the CTFC set, calculates the transmit power coefficients of the remaining CTFCs, and re-orders the CTFCs according to their transmit power coefficients. The UE 1405 then maps the re-ordered CTFCs to TFCs, and transmits a Response message 1440 to the RNC 1410. The UE 1405 and the RNC 1410 then transmit/receive data on the TrCHs.

Figure 15:
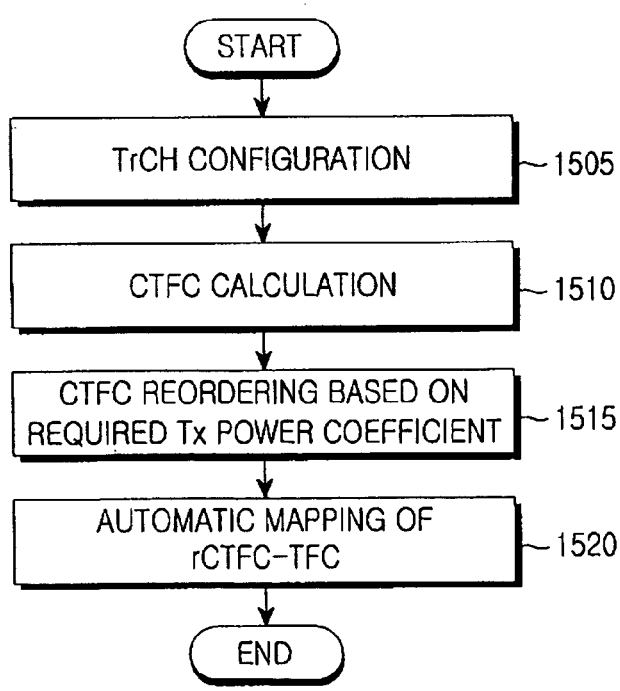
FIG. 15 is a flowchart illustrating a TFCS configuration operation in the UE according to an exemplary embodiment of the present invention.

FIG. 15 is a flowchart illustrating a TFCS configuration operation using TrCH configuration information and TFCS configuration information in the UE according to an exemplary embodiment of the present invention.

Referring to FIG. 15, upon receipt of TrCH configuration information and TFCS configuration information in step 1505, the UE calculates CTFCs based on the TrCH configuration information in step 1510. If the TFCS configuration information includes an auto mapping based on required power indicator, the UE re-orders the CTFCs according to their transmit power coefficients in step 1515. If the TFCS configuration information includes non_used_CTFC_set, the UE eliminates the CTFCs of non_used_CTFC_set from the calculated CTFCs and maps the remaining CTFCs to TFCs in a one-to-one correspondence in step 1520.

The TFCS configuration will be described in great detail with reference to FIGS. 16A, 16B and 16C. As illustrated in FIG. 5A, three TrCHs are configured for the UE.

The TFs of each TrCH are given as illustrated in FIG. 16A. Three TFs are available for DCH 1, two TFs for DCH 2, and two TFs for DCH 3. RM is set to 100 for DCH 1, 150 for DCH 2, and 120 for DCH 3. The UE calculates CTFCs using the TFs of the TrCHs.

The CTFC calculation results are shown in FIG. 16B. The CTFC calculation is performed in a similar manner as illustrated in FIG. 5B. The UE calculates transmit power coefficients for the CTFCs by Eq. (1), as ordered in the rightmost column in FIG. 16B.

Since RM is 100 bits for DCH 1, 150 bits for DCH 2 and 200 bits for DCH 3, the transmit power coefficient of CTFC 10, for example, is given as required_Tx_power_coefficiet_CTFC_10=100×100+ 150×150+120×200=56500.

For notational simplicity, non_used_CTFC_set may be assumed as not being signaled.

The UE re-orders the CTFCs in an ascending order of transmit power coefficient, as illustrated in FIG. 16C.

If two or more CTFCs have the same transmit power coefficient, the CTFCs are re-ordered in an ascending order of CTFC identifier. The CTFCs re-ordered in the ascending order of transmit power coefficient are called r_CTFCs. The UE maps the r_CTFCs to TFCs in a one-to-one correspondence.

Figure 17:
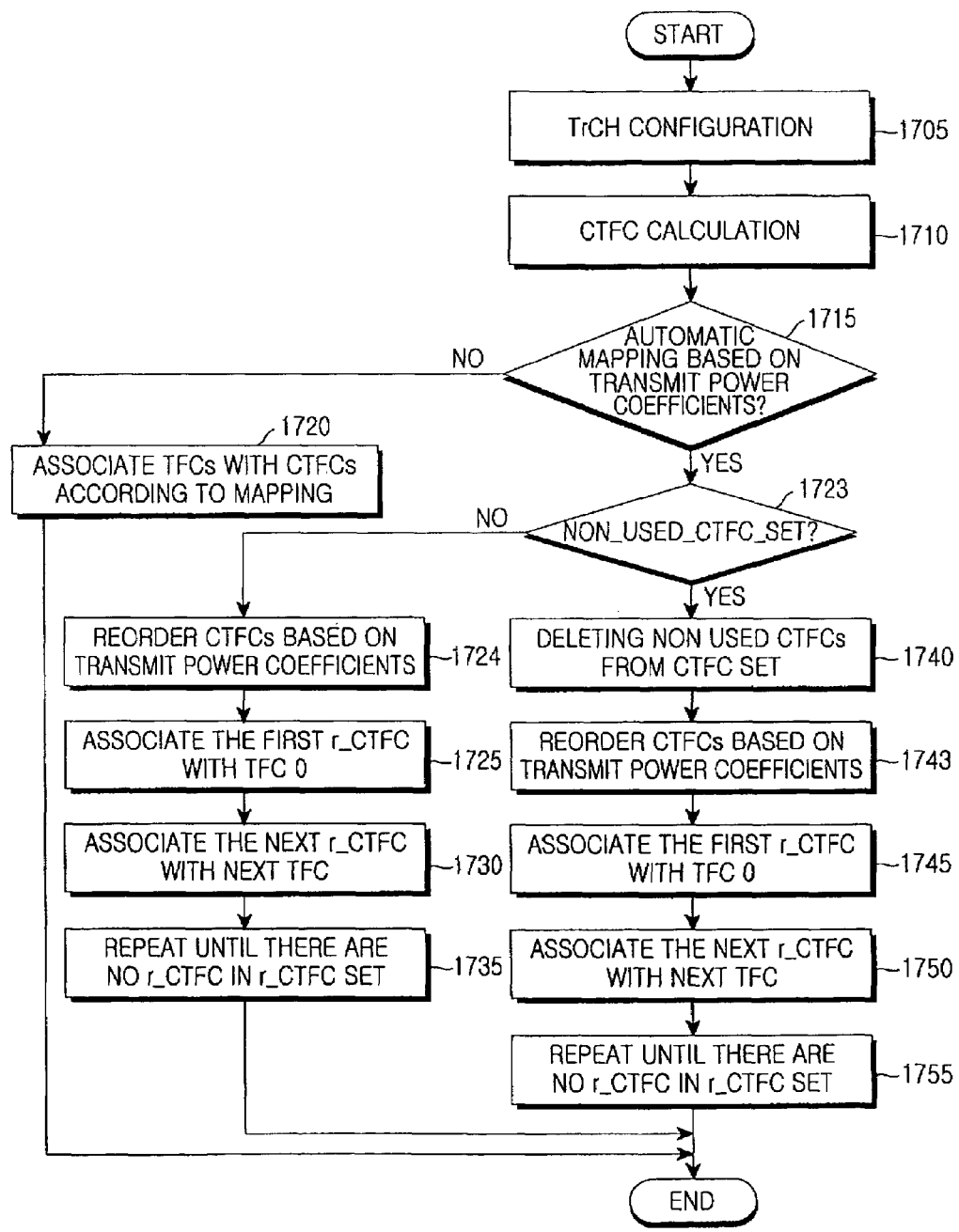
FIG. 17 is a flowchart illustrating an operation of the UE according to an exemplary embodiment of the present invention.

FIG. 17 is a flowchart illustrating an operation of the UE according t an exemplary embodiment of the present invention.

Referring to FIG. 17, upon receipt of TrCH configuration information by a TrCH establishment message in step 1705, the UE calculates a set of CTFCs based on the received information in step 1710.

In step 1715, the UE determines whether the TrCH establishment message includes an auto mapping based on required power indicator. In the absence of the auto mapping based on required power indicator, the UE maps the CTFCs to TFCs according to n TFCS configuration information received by the TrCH establishment message in step 1720. If the TFCS configuration information includes TFC-CTFC mapping information, the TFC-CTFC mapping is carried out based on the TFC-CTFC mapping information.

In the presence of the auto mapping based on required power indicator, the UE determines whether the TFCS configuration information includes non_used_CTFC_set in step 1723.

In the absence of non_used_CTFC_set, the UE proceeds to step 1724. In the presence of non_used_CTFC_set, the UE proceeds to step 1740.

In step 1724, the UE calculates the transmit power coefficients of the CTFCs and re-orders the CTFCs in an ascending order of transmit power coefficient. If two or more CTFCs have the same transmit power coefficient, they are re-ordered in an ascending order of CTFC identifier. The UE allocates identifiers to these r_CTFCs, the identifiers starting from 0 and increasing by 1 for every following r_CTFC.

The UE maps r_CTFC 0 to TFC 0 in step 1725 and maps the next r_CTFC to the next TFC in step 1730. In step 1735, the UE repeats the automatic mapping until every r_CTFC is mapped to a TFC.

In the presence of non_used_CTFC_set in step 1723, the UE eliminates the CTFCs of non_used_CTFC_set from the CTFC set in step 1740.

In step 1743, the UE calculates the transmit power coefficients of the CTFCs and re-orders the CTFCs in an ascending order of transmit power coefficient. If two or more CTFCs have the same transmit power coefficient, they are re-ordered in an ascending order of CTFC identifier. The UE allocates identifiers to these r_CTFCs, the identifiers starting from 0 and increasing by 1 for every following r_CTFC. The UE maps r_CTFC 0 to TFC 0 in step 1745 and maps the next r_CTFC to the next TFC in step 1750. In step 1755, the UE repeats the automatic mapping until every r_CTFC is mapped to a TFC.

Figure 18:
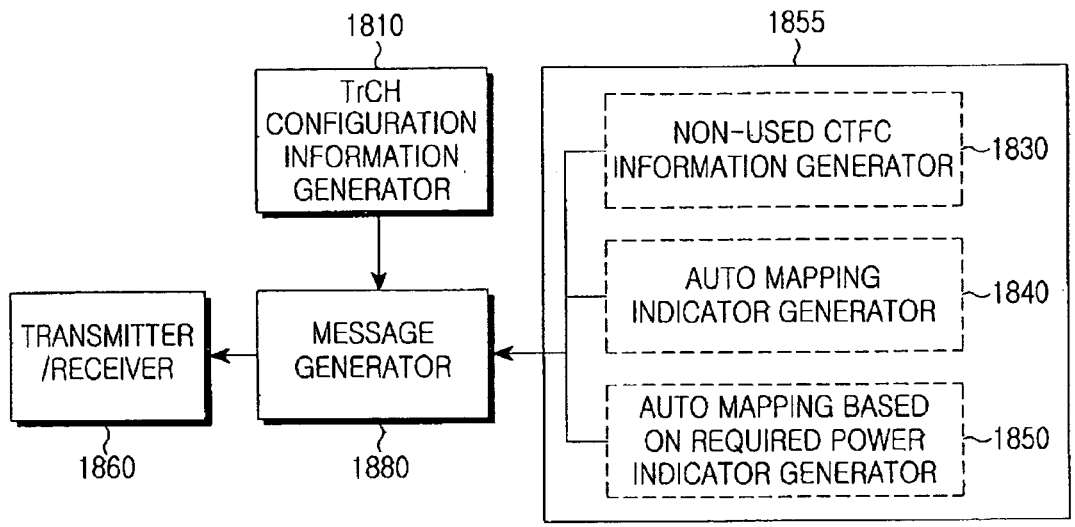
FIG. 18 is a block diagram of an RNC according to exemplary embodiments of the present invention.

FIG. 18 is a block diagram of an RNC according to exemplary embodiments.

Referring to FIG. 18, the RNC transmits to a UE TrCH configuration information created by a TrCH configuration information generator 1810, and TFCS configuration information created by a TFCS configuration information generator 1855 in a TrCH establishment message created by a message generator 1880.

The TrCH configuration information generator 1810 generates configuration information related to TrCHs to be established. The TFCS configuration information generator 1855 generates the TFCS configuration information of the TrCHs and provides the TFCS configuration information to the message generator 1880. In accordance with an exemplary embodiment of the present invention, the TFCS configuration information generator 1855 is equipped with an auto mapping indicator generator 1840. The auto mapping indicator generator 1840 generates an auto mapping indicator indicating automatic TFC-CTFC mapping. The message generator 1880 inserts the auto mapping indicator into the TFCS configuration information and provides the TrCH establishment message with the TrCH configuration information and the TFCS configuration information to a transmitter/receiver 1860. The transmitter/receiver 1860 transmits the TrCH establishment message to the UE on a control channel.

In accordance with an exemplary embodiment of the present invention, the TFCS configuration information generator 1855 is equipped with the auto mapping indicator generator 1840 and a non-used CTFC information generator 1830, for generating the auto mapping indicator indicating automatic TFC-CTFC mapping and non_used_CTFC_set. The message generator 1880 inserts the auto mapping indicator and non_used_CTFC_set into the TFCS configuration information and provides the TrCH establishment message with the TrCH configuration information and the TFCS configuration information to the transmitter/receiver 1860. The transmitter/receiver 1860 transmits the TrCH establishment message to the UE on the control channel.

In accordance with an exemplary embodiment of the present invention, the TFCS configuration information generator 1855 is equipped with an auto mapping based on required power indicator generator 1840 and the non-used CTFC information generator 1830, for generating an auto mapping based on required power indicator indicating automatic TFC-CTFC mapping based on transmit power and non_used_CTFC_set. The message generator 1880 inserts the auto mapping based on required power indicator and non_used_CTFC_set into the TFCS configuration information and provides the TrCH establishment message with the TrCH configuration information and the TFCS configuration information to the transmitter/receiver 1860. The transmitter/receiver 1860 transmits the TrCH establishment message to the UE on the control channel.

Figure 19:
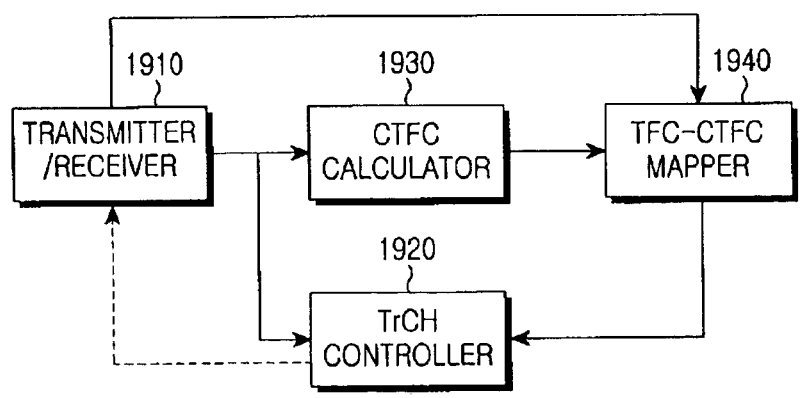
FIG. 19 is a block diagram of the UE according to exemplary embodiments of the present invention.

FIG. 19 is a block diagram of a UE according to the exemplary embodiments of the present invention.

Referring to FIG. 19, in the UE, a transmitter/receiver 1910 receives a TrCH establishment message including TrCH configuration information and TFCS configuration information from an RNC. A TrCH controller 1920 establishes TrCHs based on the TrCH configuration information. A CTFC calculator 1930 calculates CTFCs for the TrCHs, and a TFC-CTFC mapper 1940 maps the CTFCs to TFCs based on the TFCS configuration information.

If the TFCS configuration information includes an auto mapping indicator instead of TFC-CTFC mapping information, the TFC-CTFC mapper 1940 automatically maps the CTFCs to TFCs in a one-to-one correspondence. If the TFCS configuration information includes an auto mapping indicator and non-used CTFC information, the TFC-CTFC mapper 1940 eliminates CTFCs indicated by the non-used CTFC information, and maps the remaining CTFCs to TFCs. If the TFCS configuration information includes an auto mapping based on required power indicator and non-used CTFC information, the TFC-CTFC mapper 1940 eliminates CTFCs indicated by the non-used CTFC information, calculates the transmit power coefficients of the remaining CTFCs, re-orders the remaining CTFCs according to their transmit power coefficients, and maps the re-ordered CTFCs to TFCs.

After the TFC-CTFC mapping, the transmitter/receiver 1910 transmits a Response message to the RNC. The UE and the RNC then transmit/receive data on the TrCHs based on the TFCs.

As described above, the exemplary embodiments of the present invention advantageously reduces the time required for configuring a TFCS and the amount of associated control information in a mobile communication system. Therefore, the time taken for call setup is reduced and radio transmission resources are efficiently used.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of configuring a transport format combination set (TFCS) in a mobile communication system, the method comprising:

receiving transport channel configuration information and TFCS configuration information in a transport channel establishment message from a radio network controller (RNC);

calculating a calculated transport format combination (CTFC) set including all possible combinations of the transport formats (TFs) of different transport channels according to the received transport channel configuration information;

determining whether the received TFCS configuration information comprises a TFC-CTFC auto mapping indicator; and mapping CTFCs in the CTFC set to TFCs in a one-to-one correspondence, if the TFCS configuration information comprises the TFC-CTFC auto mapping indicator.

2. The method of claim 1, wherein the mapping of the CTFCs comprises mapping the CTFCs in an ascending identifier order to the TFCs in a one-to-one correspondence.

3. The method of claim 1, wherein the mapping of the CTFCs comprises:

eliminating the non-used CTFCs from the CTFC set, if the received TFCS configuration information comprises non-used CTFC information indicating non-used CTFCs to be excluded from the TFC-CTFC mapping; and mapping in an ascending identifier order all CTFCs in a new CTFC set without the non-used CTFCs to TFCs in a one-to-one correspondence.

4. The method of claim 1, wherein the mapping of the CTFCs comprises:

eliminating the non-used CTFCs from the CTFC set, if the TFC-CTFC auto mapping indicator indicates automatic mapping based on CTCF transmit power and the received TFCS configuration information comprises non-used CTFC information indicating non-used CTFCs to be excluded from the TFC-CTFC mapping;

calculating the transmit power coefficients of CTFCs in a new CTFC set without the non-used CTFCs, and re-ordering the CTFCs of the new CTFC set in an ascending order of transmit power coefficient;

allocating new identifiers sequentially to the re-ordered CTFCs; and mapping the re-ordered CTFCs to TFCs in a one-to-one correspondence, in an ascending identifier order.

5. The method of claim 4, wherein the re-ordering of the CTFCs comprises, if two or more CTFCs have the same transmit power coefficient, re-ordering the CTFCs in an ascending identifier order.

6. The method of claim 1, wherein the mapping of the CTFCs comprises:

calculating the transmit power coefficients of the CTFCs of the CTFC set, if the TFC-CTFC auto mapping indicator indicates automatic mapping based on CTCF transmit power, and re-ordering the CTFCs in an ascending order of transmit power coefficient;

allocating new identifiers sequentially to the re-ordered CTFCs; and mapping the re-ordered CTFCs to TFCs in a one-to-one correspondence, in an ascending identifier order.

7. The method of claim 6, wherein the re-ordering of the CTFCs comprises, if two or more CTFCs have the same transmit power coefficient, re-ordering the CTFCs in an ascending identifier order.

8. A method of configuring a transport format combination set (TFCS) in a mobile communication system, the method comprising:

generating transport channel configuration information related to establishment of transport channels;

generating TFCS configuration information comprising a transport combination format calculated transport format combination (TFC-CTFC) auto mapping indicator indicating one-to-one mapping between CTFCs and TFCs, the CTFCs being all possible combinations of transport formats (TFs) of different transport channels;

inserting the generated transport channel configuration information and the TFCS configuration information into a transport channel establishment message; and transmitting the transport channel establishment message to a user equipment (UE).

9. The method of claim 8, wherein the TFC-CTFC auto mapping indicator indicates mapping the CTFCs in an ascending identifier order to the TFCs in a one-to-one correspondence.

10. The method of claim 9, wherein the TFCS configuration information further comprises non-used CTFC information indicating CTFCs to be excluded from the TFC-CTFC mapping.

11. The method of claim 8, wherein the TFC-CTFC auto mapping indicator indicates mapping between the CTFCs and the TFCs based on CTCF transmit power.

12. The method of claim 11, wherein the generated TFCS configuration information further comprises non-used CTFC information indicating CTFCs to be excluded from the TFC-CTFC mapping.

13. The method of claim 8, wherein the transport channel establishment message comprises at least one of a radio bearer setup message and a transport channel reconfiguration message.

14. An apparatus for configuring a transport format combination set (TFCS) in a mobile communication system, the apparatus comprising:

a transmitter and receiver for receiving transport channel configuration information and TFCS configuration information in a transport channel establishment message from a radio network controller (RNC), and transmitting a response message to the RNC, when transport channels are completely configured according to the transport channel establishment message;

a transport channel controller for establishing the transport channels based on the received transport channel configuration information;

a calculated transport format combination (CTFC) calculator for calculating a CTFC set comprising all possible combinations of transport formats (TFs) of different transport channels according to the received transport channel configuration information; and a transport combination format -calculated transport format combination (TFC)-CTFC mapper for determining whether the TFCS configuration information comprises a TFC-CTFC auto mapping indicator, mapping CTFCs comprised in the CTFC set to TFCs in a one-to-one correspondence, if the received TFCS configuration information comprises the TFC-CTFC auto mapping indicator, and providing information regarding the mapping to the transport channel controller.

15. The apparatus of claim 14, wherein the TFC-CTFC mapper maps the CTFCs in an ascending identifier order to the TFCs in a one-to-one correspondence.

16. The apparatus of claim 14, wherein, if the received TFCS configuration information comprises non-used CTFC information indicating CTFCs to be excluded from the TFC-CTFC mapping, the TFC-CTFC mapper eliminates non-used CTFCs indicated by the non-used CTFC information from the CTFC set, and maps in an ascending identifier order all CTFCs in a new CTFC set without the non-used CTFCs to TFCs in a one-to-one correspondence.

17. The apparatus of claim 14, wherein, if the TFC-CTFC auto mapping indicator indicates automatic mapping based on CTCF transmit power and the received TFCS configuration information comprises non-used CTFC information indicating CTFCs to be excluded from the TFC-CTFC mapping, the TFC-CTFC mapper eliminates the non-used CTFCs from the CTFC set, calculates the transmit power coefficients of CTFCs in a new CTFC set without the non-used CTFCs, re-orders the CTFCs of the new CTFC set in an ascending order of transmit power coefficient, allocates new identifiers sequentially to the re-ordered CTFCs, and maps in an ascending identifier order the re-ordered CTFCs to TFCs in a one-to-one correspondence.

18. The apparatus of claim 17, wherein, if two or more CTFCs have the same transmit power coefficient, the TFC-CTFC mapper re-orders the CTFCs in an ascending identifier order.

19. The apparatus of claim 14, wherein, if the TFC-CTFC auto mapping indicator indicates automatic mapping based on CTCF transmit power, the TFC-CTFC mapper calculates the transmit power coefficients of the CTFCs of the CTFC set, re-orders the CTFCs in an ascending order of transmit power coefficient, allocates new identifiers sequentially to the re-ordered CTFCs, and maps in an ascending identifier order the re-ordered CTFCs to TFCs in a one-to-one correspondence.

20. The apparatus of claim 19, wherein, if two or more CTFCs have the same transmit power coefficient, the TFC-CTFC mapper re-orders the CTFCs in an ascending identifier order.

21. An apparatus for configuring a transport format combination set (TFCS) in a mobile communication system, the apparatus comprising:
 a transport channel configuration information generator for generating transport channel configuration information related to establishment of transport channels;
 a TFCS configuration information generator for generating TFCS configuration information comprising a TFC-CTFC auto mapping indicator indicating one-to-one mapping between calculated transport format combinations (CTFCs) and transport format combination (TFCs), the CTFCs being all possible combinations of transport formats (TFs) of different transport channels;
 a message combiner for inserting the generated transport channel configuration information and the generated TFCS configuration information into a transport channel establishment message; and
 a transmitter and receiver for transmitting the transport channel establishment message to a user equipment (UE).

22. The apparatus of claim 21, wherein the TFC-CTFC auto mapping indicator indicates mapping of the CTFCs in an ascending identifier order to the TFCs in a one-to-one correspondence.

23. The apparatus of claim 22, wherein the generated TFCS configuration information further comprises non-used CTFC information indicating CTFCs to be excluded from the TFC-CTFC mapping.

24. The apparatus of claim 21, wherein the TFC-CTFC auto mapping indicator indicates mapping between the CTFCs and the TFCs based on CTFC transmit power.

25. The apparatus of claim 24, wherein the generated TFCS configuration information further comprises non-used CTFC information indicating CTFCs to be excluded from the TFC-CTFC mapping.

26. The apparatus of claim 21, wherein the transport channel establishment message comprises at least one of a radio bearer setup message and a transport channel reconfiguration message.

* * * * *

UNITED STATES PATENT AND TRADEMARK OFFICE
CERTIFICATE OF CORRECTION

PATENT NO. : 7,626,964 B2  
APPLICATION NO. : 11/387057  
DATED : December 1, 2009  
INVENTOR(S) : Kim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Second Day of November, 2010

David J. Kappos  
*Director of the United States Patent and Trademark Office*